United States Patent [19]

Kotera et al.

[11] 4,340,519
[45] Jul. 20, 1982

[54] POLYESTER RESIN AQUEOUS DISPERSION

[75] Inventors: Nobukazu Kotera, Kyoto; Yutaka Mizumura, Shiga; Hideo Miyake, Otsu, all of Japan

[73] Assignee: Toyo Boseki Kabushiki Kaisha, Osaka, Japan

[21] Appl. No.: 217,629

[22] Filed: Dec. 18, 1980

[30] Foreign Application Priority Data

Dec. 21, 1979 [JP] Japan .................. 54-167002

[51] Int. Cl.$^3$ .................. C08L 67/02; C08L 81/08
[52] U.S. Cl. .................. 523/414; 260/DIG. 38; 428/458; 428/480; 525/444; 524/376; 524/385; 524/389; 524/539
[58] Field of Search .................. 260/29.2 E, 29.2 TN, 260/29.2 EP, 29.4 R; 525/444; 528/295

[56] References Cited

U.S. PATENT DOCUMENTS

| | | | |
|---|---|---|---|
| 3,546,008 | 12/1970 | Shields et al. | 117/138.8 |
| 4,022,740 | 5/1977 | Morie et al. | 260/29.2 E |
| 4,104,262 | 8/1978 | Schade | 260/29.2 E |

FOREIGN PATENT DOCUMENTS

47-40873 10/1972 Japan.

*Primary Examiner*—Theodore E. Pertilla
*Attorney, Agent, or Firm*—Jones, Tullar & Cooper

[57] ABSTRACT

An aqueous dispersion of polyester resin which comprises (A) a crystalline polyester having a melting point of 70° to 200° C. and containing 0.5 to 10% by mole of an aromatic dicarboxylic acid having a metal sulfonate group as the polycarboxylic acid component, (B) a non-crystalline polyester having a softening point of 40° to 200° C. and containing 0.5 to 10% by mole of an aromatic dicarboxylic acid having a metal sulfonate group as the polycarboxylic acid component, (C) a water-soluble organic compound having a boiling point of 60° to 200° C., and (D) water, said components (A), (B), (C) and (D) being incorporated in the following weight ratio:

$$A/B = 0 - 95/100 - 5 \quad (1)$$

$$A + B/C/D = 10 - 70/2 - 40/20 - 88 \quad (2)$$

$$0.02 \leq C/C + D \leq 0.66. \quad (3)$$

The aqueous dispersion of this invention has excellent dispersibility in water and can give a coating layer having excellent water resistance and weatherability and hence is useful for preparation of various laminated products, coating compositions, aqueous printing ink, aqueous binder for coating and surface treating agent for giving drip-proof.

10 Claims, No Drawings

POLYESTER RESIN AQUEOUS DISPERSION

The present invention relates to a polyester resin aqueous dispersion, more particularly an aqueous dispersion of a polyester resin having a fine particle size which can give a coating film having excellent water resistance and excellent weatherability.

Hitherto, a large amount of various organic solvents have widely been used in various fields such as paints, ink, coating compositions, adhesives, treating agents for textile or paper products, or the like. Recently, however, it becomes very difficult to use a large amount of organic solvents in view of saving oil resources and preventing of environmental pollution. Accordingly, it has been proposed to prepare the above-mentioned compositions in the form of non-organic solvent, such as (1) high solid type, (2) non-aqueous dispersion type, (3) aqueous dispersion type, (4) emulsion type, and (5) non-solvent type. Among them, the aqueous dispersion type compositions are most useful because of easy handling.

On the other hand, the conventional resins used for these compositions are mostly hydrophobic, and hence, it is problem how to disperse them into water or to make them compatible with water. Moreover, it is also problem that the resin aqueous dispersion can give a coating film having excellent water resistance and excellent weatherability. These problems are common in all resins including polyester resins.

There have already been proposed some methods for dispersing polyester resins into water or for making them compatible with water, for example by copolymerizing them with hydrophilic monomers, such as a compound having a metal sulfonate group, an aliphatic dicarboxylic acid, or a mixture thereof. However, these hydrophilic monomers should be used in a large amount in order to give the polyester resins sufficient water-dispersibility or water-compatibility, and further, the resulting aqueous dispersion of polyester resins gives merely a coating film having inferior water resistance and weatherability and inferior adhesion properties.

For instance, it is disclosed in Japanese Patent Publication No. 40873/1972 that in order to sufficiently disperse the resins into water, 8% by mole or more (based on the total acid components) of a compound having a metal sulfonate group and 20% by mole or more (based on the total glycol components) of polyethylene glycol are required. It will readily be understood that such polyester resins show inferior water resistance and weatherability. That is, when a resin has sufficient dispersibility into water, it results in inferior water resistance of the coating film prepared by coating the resin aqueous dispersion, followed by drying. In this case, when the formed coating film is contacted with water, it shows decreased adhesion and color change. Accordingly, such a resin can not be used for preparation of paints, inks, coating compositions, adhesives, or the like. Besides, when a large amount of polyethylene glycol is used, the resulting resin shows significantly decreased water resistance and weatherability.

It is also well known that when a large amount of an aliphatic dicarboxylic acid is copolymerized, the resulting polyester resin shows decreased properties such as inferior mechanical properties.

Thus, the practically useful resin should satisfy both of the inconsistent properties, i.e. hydrophilic properties and water resistance and weatherability.

Under the circumstances, the present inventors have intensively studied on the production of an improved polyester resin aqueous dispersion without decreasing the water resistance and weatherability. As a result, it has been found that an aqueous dispersion comprising one or two kinds of specific polyester containing a metal sulfonate group, a water-soluble organic compound and water satisfies the desired properties.

An object of the present invention is to provide an improved aqueous dispersion of polyester resin which can give a coating film having excellent water resistance and weatherability. Another object of the invention is to provide an improved polyester resin satisfying both of the water dispersibility and also the water resistance and weatherability. A further object of the invention is to provide use of the polyester resin aqueous dispersion for various utilities such as coating compositions, laminated products, aqueous printing ink, aqueous binder for coating, and surface treating agent for giving drip-proof. These and other objects and advantages of the present invention will be apparent to persons skilled in the art by the following description.

The aqueous dispersion of polyester resin of the present invention comprises (A) a crystalline polyester having a melting point of 70 to 200° C. and containing 0.5 to 10% by mole of an aromatic dicarboxylic acid having a metal sulfonate group as the polycarboxylic acid component, (B) a non-crystalline (i.e. amorphous) polyester having a softening point of 40 to 200° C. and containing 0.5 to 10% by mole of an aromatic dicarboxylic acid having a metal sulfonate group as the polycarboxylic acid component, (C) a water-soluble organic compound having a boiling point of 60 to 200° C., and (D) water, said components (A), (B), (C) and (D) being incorporated in the following weight ratio:

$$A/B = 0 - 95/100 - 5 \tag{1}$$

$$A + B/C/D = 10 - 70/2 - 40/20 - 88 \tag{2}$$

$$0.02 \leq C/C + D \leq 0.66. \tag{3}$$

By incorporating (A) a crystalline polyester resin containing a metal sulfonate group, (B) a non-crystalline polyester resin containing a metal sulfonate group, (C) a water-soluble organic compound having a boiling point of 60° to 200° C., and (D) water in the specified weight ratio, there can be obtained an aqueous dispersion having both of hydrophilic properties and high adhesion and water resistance. The aqueous dispersion thus obtained has a particle size of 1μ or less and is very stable.

The crystalline and non-crystalline polyester resins contain 0.5 to 10% by mole of aromatic dicarboxylic acid having a metal sulfonate group as the polycarboxylic acid component. Preferably, the crystalline and non-crystalline polyester resins have a molecular weight of 2,500 to 30,000 and comprise polycarboxylic acid components consisting of 40 to 99.5% by mole of an aromatic dicarboxylic acid having no metal sulfonate group, 59.5 to 0% by mole of an aliphatic or alicyclic dicarboxylic acid having 4 to 36 carbon atoms and 0.5 to 10% by mole of an aromatic dicarboxylic acid having a metal sulfonate group, and polyol components consisting of 20 to 100% by mole of an aliphatic glycol having 2 to 8 carbon atoms and/or an alicyclic glycol having 6 to 12 carbon atoms and 80 to 0% by mole of bisphenol A ethylene oxide (or propylene oxide) adduct.

Suitable examples of the aromatic dicarboxylic acid having no metal sulfonate group are terephthalic acid, isophthalic acid, orthophthalic acid, 2,6-naphthalene-dicarboxylic acid, or the like. These aromatic dicarboxylic acid having no metal sulfonate group is preferably incorporated in an amount of 40 to 99.5% by mole based on the total polycarboxylic acid components. When the content of the aromatic dicarboxylic acid having no metal sulfonate group is less than 40% by mole, the polyester resin thus obtained has disadvantageously inferior mechanical strength and inferior water resistance, and on the other hand, when the content is over 99.5% by mole, the polyester resin is hardly dispersible into the aqueous system.

Suitable examples of the aliphatic or alicyclic dicarboxylic acid are succinic acid, adipic acid, azelaic acid, sebacic acid, dodecanedionic acid, dimer acid tetrahydrophthalic acid, hexahydrophthalic acid, hexahydroisophthalic acid, hexahydroterephthalic acid, or the like. Particularly, adipic acid, sebacic acid and azelaic acid are suitable. The aliphatic and/or alicyclic dicarboxylic acids are preferably incorporated in an amount of 59.5 to 0% by mole based on the total polycarboxylic acid components. When the amount of the aliphatic and/or alicyclic dicarboxylic acid is more than 59.5% by mole, the polyester resin obtained shows decreased water resistance and mechanical strength of the coating film prepared therefrom, and shows tackiness. Optionally, p-hyroxybenzoic acid, p-(2-hydroxyethoxy)benzoic acid, or hydroxypivalic acid, γ-butyrolactone, ε-caprolactone, or the like may be incorporated as the polycarboxylic acid component. Moreover, tri- or more polyvalent polycarboxylic acid such as trimellitic acid, pyromellitic acid may optionally be incorporated in an amount of not more than 10% by mole, usually 0.01 to 10% by mole based on the total polycarboxylic acid components.

Suitable examples of the aliphatic glycol having 2 to 8 carbon atoms are ethylene glycol, propylene glycol, 1,3-propanediol, 1,4-butanediol, neopentyl glycol, 1,5-pentanediol, 1,6-hexanediol, or the like. Suitable examples of the alicyclic glycol having 6 to 12 carbon atoms are 1,4-cyclohexanedimethanol, or the like. These aliphatic glycol having 2 to 8 carbon atoms and alicyclic glycol having 6 to 12 carbon atoms are incorporated in an amount of 90 to 100% by mole based on the total polyol components. Optionally, tri- or more polyvalent polyols such as trimethylolpropane, trimethylolethane, glycerine, pentaerythritol, or the like may be incorporated in an amount of not more than 10% by mole, usually 0.01 to 10% by mole, based on the total polyol components. Moreover, polypropylene glycol or polytetramethylene glycol having a molecular weight of 500 to 5,000 may optionally be incorporated in an amount of not more than 40% by weight, usually 0.01 to 40% by weight, based on the total polyol components. Besides a polyalkylene glycol, particularly a polyethylene glycol having a molecular weight of 106 to 10,000 may optionally be incorporated in an amount of not more than 10% by weight, preferably 0.01 to 5% by weight, based on the total polyol components. When the polyalkylene glycol, particularly polyethylene glycol is incorporated in an amount of more than 10% by weight, the polyester resin shows extremely decreased water resistance and weatherability. Suitable crystalline polyester comprises 50 to 99.5% by mole of an aromatic dicarboxylic acid selected from terephthalic acid and isophthalic acid as the polycarboxylic acid component and 85 to 100% by mole of a polyl selected from ethylene glycol and butanediol as the polyol component. Besides, suitable non-crystalline polyester comprises 10 to 80% by mole of terephthalic acid as the polycarboxylic acid component and 20 to 80% by mole of a polyol selected from ethylene glycol and butanediol as the polyol component.

Suitable examples of the aromatic dicarboxylic acid having a metal sulfonate group are metal salts on sulfo-aromatic dicarboxylic acids, such as sulfoterephthalic acid, 5-sulfo-isophthalic acid, 4-sulfophthalic acid, 4-sulfonaphthalene-2,7-dicarboxylic acid, 5-(4-sulfophenoxy)isophthalic acid, or the like. The metal salts include salts of the metals such as lithium (Li), sodium (Na), potassium (K), magnesium (Mg), calcium (Ca), copper (Cu), iron (Fe), or the like. Particularly suitable compound is 5-sodium sulfo-isophthalic acid. The aromatic dicarboxylic acids having a metal sulfonate group are incorporated in an amount of 0.5 to 10% by mole, preferably 1.0 to 6% by mole, based on the total polycarboxylic acid components. When the aromatic dicarboxylic acid having a metal sulfonate group is entirely not incorporated, the polyester resin obtained shows remarkably inferior dispersibility into water. With increase of the amount of aromatic dicarboxylic acid having a metal sulfonate group, the polyester resin obtained shows better dispersibility into water. However, when the amounts of the aromatic dicarboxylic acid having a metal sulfonate group is over 10% by mole, the polyester resin gives a coating film having remarkably inferior water resistance, while the dispersibility into water is excellent.

The crystalline polyester resin used in the present invention has a melting point of 70 to 200° C., preferably 90° to 180° C. When the crystalline polyester resin has a melting point of lower than 70° C., the polyester resin aqueous dispersion give a coating film having inferior water resistance, and on the other hand, when the melting point is higher than 200° C., the polyester resin shows less dispersibility into water. Besides, the crystalline polyester resin should have a heat of fusion of 50 cal or more, preferably 100 to 1,500 cal, per polymer unit. When it has a heat of fusion of less than 50 cal per polymer unit. The polyester resin shows inferior water resistance, particularly inferior resistance to hot water.

The non-crystalline polyester resin used in the present invention has a softening point of 40° to 200° C., preferably 60° to 180° C. When the softening point of the non-crystalline polyester resin is lower than 40° C., the polyester resin aqueous dispersion give a coating film having inferior water resistance and having unfavorable tackiness, and on the other hand, when the softening point is higher than 200° C., the polyester resin shown inferior dispersibility into water.

The crystalline and non-crystalline polyester resins have a molecular weight of 2,500 to 30,000, preferably 3,000 to 20,000. When the polyester resins have a molecular weight of smaller than 2,500, the polyester resin aqueous dispersion shows inferior water resistance and inferior adhesion properties, and also inferior mechanical properties, especially inferior flexibility, and on the other hand, when the molecular weight is larger than 30,000, the polyester resins shows inferior dispersibility into water, and further it is difficult to incorporate the resins into the aqueous dispersion in a large amount because the aqueous dispersion thereof shows too high viscosity.

The polyester resins can be produced by any conventional methods. The polyester resins may optionally be used after being mixed with an amino resin, an epoxy compound, an isocyanate compound or the like in the molten state or in the form of a solution in a water-soluble organic compound, or may be used in the form of a partial reaction product with the above-mentioned amino resin, epoxy compound, isocyanate compound or the like.

The water-soluble organic compound used in the present invention is used for increasing the hydrophilic properties of the polyester resins and thereby promoting the dispersibility thereof into water. That is, when the polyester resins, a small amount of the water-soluble organic compound and water are mixed, there can be obtained the desired aqueous dispersion.

The water-soluble organic compounds have a solubility of 20 g or more/1 liter of water at 20° C. and include aliphatic and alicyclic alcohols, ethers, esters, ketones, or the like. Suitable examples of the water-soluble organic compounds are monovalent alcohols such as methanol, ethanol, n-propanol, isopropanol, n-butanol, isobutanol, sec-butanol, tert-butanol; glycols such as ethylene glycol, propylene glycol; glycol derivatives such as methyl cellosolve, ethyl cellosolve, n-butyl cellosolve, 3-methyl-3-methoxybutanol, n-butyl cellosolve acetate; ethers such as dioxane, tetrahydrofuran; esters such as ethyl acetate; ketones such as methyl ethyl ketone, cyclohexanone, cyclooctanone, cyclodecanone, isophorone; or the like. Particularly suitable examples are n-butyl cellosolve, ethyl cellosolve, isopropanol, or the like. These water-soluble organic compounds may be used alone or in a mixture of two or more kinds thereof. The water-soluble organic compounds have a boiling point of 60° to 200° C. When the organic compounds have a boiling point of lower than 60° C., it is very difficult to keep a temperature necessary for uniformly dispersing or dissolving the polyester resins in the water-soluble organic compound, and on the other hand, when the boiling point is higher than 200° C., the aqueous dispersion is hardly dried when coated, and further the aqueous dispersions shows less storage stability as well as inferior drying properties when an amide or sulfonate compound is used as a water-soluble compound.

The aqueous dispersion of the present invention is prepared by previously mixing a crystalline polyester resin (A), a non-crystalline polyester resin (B) and a water-soluble organic compound (C) at 50 to 200° C. and adding thereto water (D), or by adding a mixture of the components (A), (B) and (C) to water (D), followed by agitating the mixture at 40° to 120° C. Alternatively, the aqueous dispersion may be prepared by adding the polyester resins (A) and (B) into a mixture of a water-soluble organic compound (C) and water (D), followed by agitating the mixture at 40° to 100° C. In any methods, the components: a crystalline polyester resin (A), a non-crystalline polyester resin (B), a water-soluble organic compound (C) and water (D) should be incorporated in the following weight ratio in order to obtain the desired properties of the aqueous dispersion:

$$A/B = 0 - 95/100 - 5 \tag{1}$$

$$A + B/C/D = 10 - 70/2 - 40/20 - 88 \tag{2}$$

$$0.02 \leq C/C + D \leq 0.66. \tag{3}$$

The aqueous dispersion of the present invention contains the non-crystalline polyester resin (B) alone or both of the crystalline polyester resin (A) and the non-crystalline polyester resin (B), but the crystalline polyester resin (A) is preferably contained in an amount of 1% by weight or more based on the weight of the total polyester resins because the aqueous dispersion can give a coating film having greater water resistance, particularly resistance to hot water. On the other hand, when the crystalline polyester resin (A) is contained in an amount of larger than 95% by weight, the polyester resins show inferior dispersibility into water.

When the polyester resins (A) and (B) are incorporated in an amount of less than 10% by weight or more than 70% by weight based on the total weight of the aqueous dispersion, the aqueous dispersion shows unfavorably too low or too high viscosity, respectively.

When the water-soluble organic compound (C) is incorporated in an amount of less than 2% by weight based on the total weight of the aqueous dispersion, it results in less dispersibility of the polyester resins and there can not be obtained the desired stable aqueous dispersion having a particle size of less than 1μ. On the other hand, when the water-soluble organic compound is incorporated in an amount of more than 40% by weight, the aqueous dispersion shows unfavorably inferior drying properties. Partcularly preferable amount of the water-soluble organic compound (C) is in the range of 2.5 to 30% by weight based on the total weight of the aqueous dispersion.

The aqueous dispersion of the present invention can be used for various purposes as it stands, but may be used after being mixed with one or more crosslinking agents such as amino resins, epoxy compounds and isocyanate compounds.

Suitable examples of the amino resins are formaldehyde adduct of urea, melamine or benzoguanamine, and alkylated product thereof with an alcohol having 1 to 6 carbon atoms, which may optionally be used together with formaline to give preferable effect.

Suitable examples of the epoxy compounds are polyglycidyl esters and ethers, such as diglycidyl ether of bisphenol A or its oligomer, diglycidyl ether of hydrogenated bisphenol A or its oligomer, diglycidyl orthophthalate, diglycidyl isophthalate, diglycidyl terephthalate, p-hydroxybenzoic acid glycidyl ester ether, diglycidyl tetrahydrophthalate, diglycidyl hexahydrophthalate, diglycidyl succinate, diglycidyl adipate, diglycidyl sebacate, ethylene glycol diglycidyl ether, propylene glycol diglycidyl ether, 1,4-butanediol diglycidyl ether, 1,6-hexanediol diglycidyl ether, and other polyalkylene glycol diglycidyl ethers, triglycidyl trimellitate, triglycidyl isocyanurate, 1,4-diglycidyloxybenzene, diglycidyldimethylhydantoin, diglycidylethyleneurea, diglycidylpropyleneurea, glycerol polyglycidyl ether, trimethylolethane polyglycidyl ether, trimethylolpropene polyglycidyl ether, pentaerythritol polyglycidyl ether, polyglycidyl ether of glycelol alkylene oxide adduct, or the like.

The isocyanate compounds include aromatic, aliphatic and araliphatic diisocyanates, tri- or more polyvalent polyisocyanates, which may be low molecular compounds or high molecular compounds. Suitable examples of the isocyanate compounds are tetramethylene diisocyanate, hexamethylene diisocyanate, toluene diisocyanate, diphenylmethane diisocyanate, hydrogenated diphenylmethane diisocyanate, xylylene diisocyanate, hydrogenated xylylene diisocyanate, trimer of isophorone diisocyanate, or compounds having terminal isocyanate group which are obtained by reacting an excess amount of the above-mentioned isocyanate compounds with low molecular active hydrogen compounds such as ethylene glycol, propylene glycol, trimethylolpropane, glycerine, sorbitol, ethylenediamine, monoethanolamine, diethanolamine, or triethanolamine; or high molecular active hydrogen compounds such as various polyether polyols, polyester polyols, or polyamides.

The isocyanate compounds may be blocked isocyanate compounds which are prepared by subjecting the above-mentioned isocyanate compounds to an addition reaction with a blocking agent. Suitable examples of the blocking agent are phenols such as phenol, thiophenol, methylthiophenol, ethylphenol, cresol, xylenol, resorcinol, nitrophenol, chlorophenol; oximes such as acetoxime, methyl ethyl ketoxime, cyclohexanone oxime; primary alcohols such as methanol, ethanol, propanol, butanol; halogeno-alcohols such as ethylene chlorohydrin, 1,3-dichloro-2-propanol; tertiary alcohols such as tert-butanol, tert-pentanol, tert-butanethiol; lactams such as $\epsilon$-caprolactam, $\delta$-valerolactam, $\gamma$-butyrolactam, $\beta$-propiolactam; aromatic amines; imides; active methylene compounds such as acetylacetone, acetoacetic acid esters, ethyl malonate, mercaptanes; imines; ureas; diallyl compounds; sodium bisulfite, or the like.

A curing agent or a crosslinking promoting agent may be incorporated together with the crosslinking agent.

The crosslinking agent may be incorporated into the aqueous dispersion in various manners in accordance with the kinds of the agents, for example, by admixing to the crystalline polyester resin (A) or the non-crystalline polyester resin (B), adding directly to the aqueous dispersion, or dissolving previously in the water-soluble organic compound (C) or a mixture of the water-soluble organic compound (C) and water (D).

The polyester resin aqueous dispersion of the present invention can be used for various utilities, such as adhesives, inks, particularly aqueous printing ink, coating composition, aqueous binder for coating, treating agent for textile or paper products, particularly surface treating agent for giving drip-proof, or the like, and can give these products excellent water resistance and excellent weatherability.

For example, the aqueous dispersion of the present invention can be used as paints, particularly easily peelable paint which is used for coating onto the surface of metals, steel plates, plastic articles or the like in order to prevent the products from soil or scratch during storage thereof and can easily be peeled off when the products are used. For this purpose, the aqueous dispersion may be used as it stands, but may be used after being admixed with other resin aqueous dispersions or emulsions, pigments and other various additives. Other resin aqueous dispersions or emulsions include aqueous dispersions or emulsions of acrylic resin, urethane resin, ethylenevinyl acetate resin, rubber latex or the like. Pigments include inorganic pigments such as titanium oxide, silicone oxide, magnesium oxide, zinc oxide, talc; or other coloring agents. Other additives include fluoric, silicone or acrylic flowability improvers, antioxidants, antifungal agents, or the like.

The polyester resin aqueous dispersion of the present invention is useful for the preparation of various laminated products. That is, the polyester resin aqueous dispersion is coated onto the surface of various metallic products (e.g. various products of iron, aluminum, tin, lead, zinc or the like, more particularly cold-rolled steel plate, zinc phosphate-treated steel plate, galvanized sheet, tinplate, aluminum plate, etc.), various plastic products (e.g. films or sheets of polyesters such as polyethylene terephthalate or polybutylene terephthalate, or polyvinyl chloride), or various fiber products (e.g. woven, knitted or non-woven products of synthetic fibers such as polyamide, polyester or natural fibers such as cotton, wool), and thereon a non-solvent type polyester resin is coated or a polyester film is laminated, by which there is produced a laminated product having excellent durability, adhesion and water resistance which is useful as outdoor building materials such as pipe, fence, coated steel plate, or hot-melt adhesives. The polyester resin aqueous dispersion can be coated onto the various products with conventional means such as roll coater, bar coater, spray coater in a thickness of 0.5 to 20 $\mu$, preferably 1 to 10 $\mu$. The coating of the non-solvent type polyester resin or the laminating of a polyester film onto the products coated with the aqueous dispersion can be carried out by conventional methods such as extrusion lamination, powder coating, film lamination, or the like in a thickness of 5 to 300 $\mu$, preferably 20 to 150 $\mu$.

The polyester resin aqueous dispersion of the present invention is also useful for the preparation of an aqueous printing ink by mixing with pigments. Suitable examples of the pigments are white pigments (e.g. titanium oxide, zinc white, white lead), black pigments (e.g. carbon black, lamp black, graphite), gray pigments (e.g. zinc powder, lead suboxide, slate dust), red pigments (e.g. cadmium red, cadmium-mercury red, red ocher), yellow pigments (e.g. cadmium yellow, zinc yellow, chrome yellow, titanium yellow), green pigments (e.g. viridian, chrome oxide green, cobalt green, chrome green), blue pigments (e.g. ultramarine blue, iron blue, cobalt blue), violet pigments (e.g. manganese violet, cobalt violet), iron oxide pigments (e.g. mars yellow, iron oxide black), extender pigments (e.g. calcium carbonate, barium sulfate, alumina, talc, clay), azo type organic pigments (e.g. permanent red 4R, Hansa yellow G, Hansa yellow 10G, brilliant carmine 3B, brilliant carmine 6B), phthalocyanine organic pigments (e.g. phthalocyanine green, first sky blue), metallic powder pigments (e.g. silver pigments, copper pigment, gold pigment), glass powder, glass flake, glass bead, or the like. The pigments are incorporated in the weight ratio of 50–2:50–98 (pigments : polyester resin contained in the aqueous dispersion). The aqueous printing ink may optionally be incorporated with conventional lubricating agents and defoaming agents, such as acrylic additives (e.g. Modaflow, made by Monsanto Co., or Polyflow S, made by Kyoeisha Yushi), silicone additives (e.g. Bysilone OL, made by Bayer, YF-3818, XF-3913, TSA-720, made by Toshiba Silicone). The aqueous printing ink thus obtained shows excellent adhesion to various plastic films (e.g. polyester film, polyvinyl chloride film), papers, metals (e.g. aluminum, copper, iron), fiber woven products, or the like and shows also excellent water resistance, anti-blocking properties and flexibility.

The polyester resin aqueous dispersion of the present invention is also useful as an aqueous binder for coating in case of being incorporated with amino resins as mentioned above. The aqueous binder for coating may also be incorporated with curing agents (e.g. acids such as p-toluenesulfonic acid, dinonylnaphthalenedisulfonic acid, hydrochloric acid), modifying agents (e.g. acrylic resin dispersion, epoxy resin dispersion, urethane resin dispersion, aqueous polyisocyanate blocked with sodium hyposulfite etc.), organic or inorganic pigments, additives for paints (e.g acrylic additives, silicone additives, fluorine additives), or the like. The aqueous binder for coating has excellent adhesion to metals and also excellent water resistance, particularly resistance against boiling water, and excellent anticorrosion, and is useful for coating of cans and further as precoating, wire coating, or baking coating.

The polyester resin aqueous dispersion of the present invention is further useful as a surface treating agent for giving drip-proof to various products such as plastic products (e.g. films, sheets or other articles of polyethylene terephthalate, polycarbonate or polyvinyl chloride), glass products, metallic products, or the like. The surface treating agents for giving drip-proof may preferably be incorporated with a nonionic surfactant, such as polyethylene glycol or its monocarboxylic acid ester, monoalkyl ether, monoalkylphenyl ether, sorbitan ester or polyethylenesorbitan ester, which have preferably an HLB of not less than 10, more preferably 13 to 30. The surface treating agent may also be incorporated with a water-soluble resin, for example, polyvinyl alcohol or its derivatives such as saponified polyvinyl acetate, or a saponified product of a copolymer of vinyl monocarboxylate and vinyl monomer (e.g. ethylene, propylene, styrene, vinyl chloride, acrylonitrile, acrylic acid, methacrylic acid, maleic acid, itaconic acid, or alkyl ester or hydroxyalkyl ester of these acids), wherein the saponification degree is preferably 40 to 100 %, or an acetal product of polyvinyl alcohol having an acetal degree of not more than 20 %. The surface treating agent may further be incorporated with other conventional additives such as curing agents, curing promoters, weathering agents, lubricating agents, pigments, and further aqueous resins such as acrylic emulsion, acrylic dispersion, polyvinyl acetate emulsion, polyvinyl chloride emulsion, self-emulsifiable polyurethane, or the like. The plastic products and glass products treated with the surface treating agent show excellent transparency, drip-proof and durability and are suitable as materials for horticultural house, materials for window, lens, or the like.

The present invention is illustrated by the following Preparations and Examples but is not limited thereto.

In the Preparations and Example, "part" means part by weight unless specified otherwise, and various properties were measured in the following manner.

(1) Molecular weight: It was measured with a molecular weight measuring apparatus (115 type, made by Hitachi, Ltd.).

(2) Softening point and melting point of crystals: They were measured with a wholly automatic melting point apparatus (Model FP-1, made by Mettler Co.).

(3) Particle size of the aqueous dispersion: It was measured with a grindometer and a light microscope.

(4) Viscosity: It was measured with a B type viscometer at 20° C.

(5) Adhesion: It was measured by the method as disclosed in ASTM D-3359.

(6) Tackiness of surface of the coating film: it was evaluated by finger touch.

(7) Solvent resistance: The coating film prepared from the aqueous dispersion was rubbed with a gauze impregnated with xylene until the substrate appeared, and the time of rubbing was calculated.

(8) Erichsen value: It was measured by the method as disclosed in JIS Z-2247.

(9) Water resistance: It was measured by the method as disclosed in JIS 5400.

(10) Gloss: It was measured with a glossmeter (Type-VG 107, made by Nippon Denshoku Kogyo K.K.).

(11) Weatherability (degree of retention of surface gloss): After irradiating the coating film for 100 or 300 hours with Sunshine Weather-Ometer (made by Atlas), the gloss was measured.

The weatherability was also evaluated by measuring the change of appearance and adhesion after exposing the coating film outdoor for three months.

(12) Anticorrosion: It was measured by the method as disclosed in JIS Z-2371.

(13) Anti-blocking properties: It was evaluated by finger touch.

(14) Resistance against boiling water: After dipping the coating film in boiling water for one hour, the degree of retention of surface gloss was measured.

(15) Drip-proof: The inside wall of a stainless steel vessel was treated with a surface treating agent for giving drip-proof, and water was added to the vessel, which was heated at 50° C., and then, there was observed the formation of moisture condensation on the treated wall.

Besides, the water resistance of the products treated with the surface treating agent for giving drip-proof was evaluated by measuring the drip-proof, transparency and adhesion after washing the treated products with flowing water for one hour.

PREPARATION 1

Dimethyl terephthalate (95 parts), dimethyl isophthalate (5 parts), ethylene glycol (71 parts), neopentyl glycol (110 parts), zinc acetate (0.1 part) and antimony trioxide (0.1 part) were charged into a reactor and were subjected to an ester exchange reaction at 140° to 220° C. for 3 hours. To the reaction mixture was added 5-sodium sulfo-isophthalic acid (6.0 parts), followed by subjecting the mixture to an esterification reaction at 220° to 260° C. for one hour and further to a polycondensation reaction under reduced pressure (10–0.2 mmHg) at 240° to 270° C. for 2 hours to give a polyester resin (B-1) having a molecular weight of 19,500 and a softening point of 160° C.

In the same manner as described above except that the starting materials as shown in Table 1 were used, there were obtained various polyester resins (B-2 to B-8), properties of which are shown in Table 1.

TABLE 1

| Components (% by mole*) and properties | | Polyester resin of the present invention | | | | Polyester resin of reference | | | |
|---|---|---|---|---|---|---|---|---|---|
| | | B-1 | B-2 | B-3 | B-4 | B-5 | B-6 | B-7 | B-8 |
| Poly- | Terephthalic acid | 49 | 30 | 47 | 30 | 50 | — | 80 | 68 |

TABLE 1-continued

| Components (% by mole*) and properties | | Polyester resin of the present invention | | | | Polyester resin of reference | | | |
|---|---|---|---|---|---|---|---|---|---|
| | | B-1 | B-2 | B-3 | B-4 | B-5 | B-6 | B-7 | B-8 |
| carboxylic acid component | Isophthalic acid | 49 | 30 | 47 | 30 | 50 | 88 | 19 | 20 |
| | 5-Sodium sulfo-isophthalic acid | 2 | 1.5 | 3 | 5 | — | 12 | 1 | 2 |
| | Adipic acid | — | 38.5 | — | 30 | — | — | — | 10 |
| | Trimellitic acid anhydride | — | — | 3 | 5 | — | — | — | — |
| Polyol component | Neopentyl glycol | 60 | 35 | 58 | 35 | 60 | — | — | 60 |
| | Ethylene glycol | 40 | 65 | 42 | 65 | 40 | — | 100 | 40 |
| | Diethylene glycol | — | — | — | — | — | 100 | — | — |
| Properties | Softening point (°C.) | 160 | 110 | 130 | 92 | 157 | — | 230** | 68 |
| | Molecular weight | 19500 | 17000 | 3900 | 5200 | 18300 | 20100 | 21000 | 1550 |

*% by mole in polyester (measured by NMR)
**Melting point of crystal

PREPARATION 2

Dimethyl terephthalate (475 parts), dimethyl isophthalate (466 parts), dimethyl 5-sodium sulfo-isophthalate (45 parts), ethylene glycol (443 parts), neopentyl glycol (400 parts), zinc acetate (0.44 part), sodium acetate (0.05 part) and antimony trioxide (0.43 part) were charged in a reactor and were subjected to an ester exchange reaction at 140° to 220° C. for 4 hours. The pressure of the reaction system was gradually reduced until 5 mmHg in one hour with raising the temperature until 260° C. Finally, at 260° C. and under 0.1–0.3 mmHg, the mixture was subjected to a polycondensation reaction for one hour to give a non-crystalline polyester resin (B-9) having a molecular weight of 7,000 and a softening point of 152° C. As a result of NMR analysis, the polyester resin (B-9) was composed of terephthalic acid: 49% by mole, isophthalic acid: 48% by mole, 5-sodium sulfo-isophthalic acid: 3% by mole, ethylene glycol: 52% by mole, and neopentyl glycol: 48% by mole. Besides, the heat of fusion of the polyester resin (B-9) was measured with a differential scanning calorimeter, but no endothermic peak was observed.

In the same manner as described above except that the starting materials as shown in Table 2 were used, there were obtained various crystalline polyester resins (A-1 to A-4) and various non-crystalline polyester resins (B-10 to B-13), properties of which are shown in Table 2.

TABLE 2

| Components (% by mole) and properties | Polyester resins of the present invention | | | | | Polyesters resins of reference | | | |
|---|---|---|---|---|---|---|---|---|---|
| | A-1 | A-2 | A-3 | B-9 | B-10 | B-11 | B-12 | B-13 |
| Dicarboxylic acid component: | | | | | | | | |
| Terephthalic acid | 50 | 57 | 65 | 49 | 45 | — | 32 | 50 |
| Isophthalic acid | 10 | — | — | 48 | 50 | 80 | 30 | 50 |
| 5-Sodium sulfo-isophthalic acid | 2 | 3 | 7 | 3 | 4 | 20 | 3 | — |
| Adipic acid | 38 | 40 | 28 | — | — | — | 35 | — |
| Trimellitic acid anhydride | — | — | — | — | 1 | — | — | — |
| Glycol component: | | | | | | | | |
| Ethylene glycol | 35 | — | 25 | 52 | 58 | — | 50 | 53 |
| Neopentyl glycol | — | — | — | 48 | — | — | 50 | 47 |
| 1,4-Butanediol | 65 | 52 | 70 | — | — | — | — | — |
| 1,6-Hexanediol | — | 45 | — | — | 42 | — | — | — |
| Diethylene glycol | — | — | — | — | — | 100 | — | — |
| Polytetramethylene glycol (MW = 1000) | — | 3 | 5 | — | — | — | — | — |
| Properties: | | | | | | | | |
| Softening point (°C.) | — | — | — | 152 | 130 | 105 | <30 | 148 |
| Melting point (°C.) | 116 | 128 | 110 | — | — | — | — | — |
| Heat of fusion (cal/unit) | 270 | 320 | 260 | 0 | 0 | 0 | 0 | 0 |
| Molecular weight | 18000 | 16000 | 15000 | 7000 | 12000 | 15000 | 1500 | 12000 |

PREPARATION 3

In the same manner as described in Preparation 2 except that the starting materials as shown in Table 3 were used, there were obtained polyester resins (B-15 to B-18), properties of which are shown in Table 3.

TABLE 3

| Components (% by mole) and properties | Polyester Resin of the present invention | Polyester resin of reference | | |
|---|---|---|---|---|
| | B-15 | B-16 | B-17 | B-18 |
| Polycarboxylic acid component: | | | | |
| Terephthalic acid | 43 | 50 | 48 | 30 |
| Isophthalic acid | 50 | 50 | 48 | 15 |
| Sebacic acid | — | — | — | 50 |
| 5-Sodium Sulfo-isophthalic acid | 7 | — | 4 | 5 |
| Glycol component: | | | | |
| Ethylene glycol | — | 45 | 50 | 50 |
| 1,4-Butandediol | 35 | — | — | — |
| Neopentyl glycol | — | 55 | 50 | 50 |
| Polytetramethylene | | | | |

TABLE 3-continued

| Components (% by mole) and properties | Polyester Resin of the present invention B-15 | B-16 | Polyester resin of reference B-17 | B-18 |
|---|---|---|---|---|
| glycol (MW = 1000) | — | — | — | — |
| 1,6-Hexanediol | — | — | — | — |
| DA-350* | 65 | — | — | — |
| Properties: | | | | |
| Molecular weight | 18000 | 16000 | 2000 | 25000 |
| Softening point (°C.) | 175 | 160 | 68 | Lower than room temp. |
| Melting point (°C.) | — | — | — | — |

*DA-350: An adduct of ethylene oxide (2.5 mole) to bisphenol A (1 mole) (made by Nihon Yushi)

PREPARATION 4

Dimethyl terephthalate (970 parts), ethylene glycol (546 parts), neopentyl glycol (229 parts), zinc acetate (0.44 part) and antimony trioxide (0.43 part) were charged into a reactor and were subjected to an ester exchange reaction at 140° to 220° C. for 3 hours. The pressure of the reactor was reduced until 5 mmHg at 220° to 260° C. in 30 minutes, and thereafter, the mixture was subjected to a polycondensation reaction at 265° C. and under 0.1 to 0.3 mmHg for 90 minutes to give a faint yellow, transparent polyester resin (P-1) having a molecular weight of 20,000 and a softening point of 175° C. As a result of NMR analysis, the polyester resin (P-1) was composed of terephthalic acid: 100% by mole, ethylene glycol: 68% by mole and neopentyl glycol: 32% by mole.

In the same manner as described above except that the starting materials as shown in Table 4 were used, there were obtained polyester resins (P-2 and P-3), properties of which are shown in Table 4.

TABLE 4

| Components (% by mole) and properties | Non-solvent type polyester resin | | |
|---|---|---|---|
| | P-1 | P-2 | P-3 |
| Polycarboxylic acid component: | | | |
| Terephthalic acid | 100 | 85 | 95 |
| Isophthalic acid | — | 15 | — |
| Adipic acid | — | — | — |
| Trimellitic acid anhydride | — | — | 5 |
| Glycol component: | | | |
| Ethylene glycol | 68 | 100 | 65 |
| 1,4-Butandediol | — | — | — |
| Neopentyl glycol | 32 | — | 35 |
| Polytetramethylene glycol (MW = 1000) | — | — | — |
| Properties: | | | |
| Melting point (°C.) | — | 216 | — |
| Softening point (°C.) | 175 | — | 82 |
| Molecular weight | 20000 | 18000 | 2800 |

PREPARATION 5

Dimethyl terephthalate (95 parts), dimethyl isophthalate (95 parts), ethylene glycol (71 parts) neopentyl glycol (110 parts), zinc acetate (0.1 part) and antimony trioxide (0.1 part) were charged into a reactor and were subjected to an ester exchange reaction at 140° to 220° C. for 3 hours. After adding thereto 5-sodium sulfo-isophthalic acid (6.0 parts), the mixture was subjected to an esterification reaction at 220° to 260° C. for one hour and further subjected to a polycondensation reaction at 240° to 270° C. under reduced pressure (10 to 0.2 mmHg) for 2 hours to give a polyester resin (B-19) having a moleculare weight of 19,500 and a softening point of 160° C.

In the same manner as described above except that the starting materials as shown in Table 5 were used, there were obtained polyester resins (B-20 to B-23), properties of which are shown in Table 5.

TABLE 5

| Components (% by mole) and properties | Polyester resins of the present invention | | | Polyesters resins of reference | |
|---|---|---|---|---|---|
| | B-19 | B-20 | B-21 | B-22 | B-23 |
| Polycarboxylic acid component: | | | | | |
| Terephthalic acid | 49 | 49 | 43 | 50 | — |
| Isophthalic acid | 49 | 48 | 20 | 50 | 88 |
| 5-Sodium sulfo-isophthalic acid | 2 | 3 | 2 | — | 12 |
| Adipic acid | — | — | 30 | — | — |
| Trimellitic acid anhydride | — | — | 5 | — | — |
| Glycol component: | | | | | |
| Ethylene glycol | 40 | 48 | — | 40 | — |
| Neopentyl glycol | 60 | — | 45 | 60 | — |
| DA-350 | — | 52 | — | — | — |
| Cyclohexanedimethanol | — | — | 55 | — | — |
| Diethylene glycol | — | — | — | — | 100 |
| Properties: | | | | | |
| Softening point (°C.) | 160 | 178 | 74 | 157 | — |
| Molecular weight | 19500 | 16000 | 3100 | 18300 | 20100 |

PREPARATION 6

In the same manner as described in Preparation 1 except that the starting materials as shown in Table 6 were used, there were obtained polyester resins (B-24 to B-28), properties of which are shown in Table 6.

TABLE 6

| Components (% by mole) and properties | Polyester resins of the present invention | | Polyesters resins of reference | | |
|---|---|---|---|---|---|
| | B-24 | B-25 | B-26 | B-27 | B-28 |
| Acid component | | | | | |
| Terephthalic acid | 40 | 45 | 50 | 48 | 40 |
| Isophthalic acid | 40 | 45 | 50 | 40 | 30 |
| 5-Sodium sulfo-isophthalic acid | 5 | 10 | — | 12 | 30 |
| Adipic acid | 15 | — | — | — | — |
| Glycol component: | | | | | |
| Ethylene glycol | 40 | 30 | 53 | — | 51 |
| Neopentyl glycol | 20 | — | 47 | — | 49 |
| 1,6-Hexanediol | — | 40 | — | — | — |
| DA-350 | 40 | 30 | — | — | — |
| Diethylene glycol | — | — | — | 100 | — |
| Properties: | | | | | |
| Molecular weight | 15000 | 16000 | 15000 | 15000 | 12000 |
| Melting point (°C.) | 145 | 138 | 154 | 132 | 151 |

PREPARATION 7

In the same manner as described in Preparation 1 except that the starting materials as shown in Table 7 were used, there were obtained polyesters resins (B-29 to B-36), properties of which are shown in Table 7.

PREPARATION 8

In the same manner as described in Preparation 1 except that the starting materials as shown in Table 8 were used, there were obtained polyester resins (B-37 to B-42), properties of which are shown in Table 8.

TABLE 7

| Starting materials (% by mole) and properties | Polyester resins of the present invention | | | | Polyester resins of reference | | | |
|---|---|---|---|---|---|---|---|---|
| | B-29 | B-30 | B-31 | B-32 | B-33 | B-34 | B-35 | B-36 |
| Acid component: | | | | | | | | |
| Terephthalic acid | 54 | 35 | 48 | 49 | — | 50 | 43 | 15 |
| Isophthalic acid | 43 | 31 | 48 | 48 | 90 | 50 | 42 | 12 |
| Adipic acid | — | 30 | — | — | — | — | — | 70 |
| Trimellitic acid | — | — | 2 | 1 | — | — | — | — |
| 5-Sodium sulfo-isophthalic acid | 3 | 4 | 2 | 2 | 10 | — | 15 | 3 |
| Glycol component: | | | | | | | | |
| Ethylene glycol | 45 | — | — | 38 | — | 46 | 45 | 50 |
| Neopentyl glycol | 55 | 42 | — | — | — | 54 | 55 | 50 |
| 1,6-Hexanediol | — | — | 56 | 62 | — | — | — | — |
| 1,4-Cyclohexandimethanol | — | 58 | — | — | — | — | — | — |
| DA-350 | — | — | 44 | — | — | — | — | — |
| Diethylene glycol | — | — | — | — | 100 | — | — | — |
| Properties: | | | | | | | | |
| Molecular weight | 15000 | 12000 | 5500 | 7000 | 16000 | 15000 | 12000 | 15000 |
| Softening point (°C.) | 157 | 110 | 135 | 132 | 106 | 156 | 161 | 65 |

TABLE 8

| Components (% by mole) and properties | Polyester resins of the present invention | | | Polyesters resins of reference | | |
|---|---|---|---|---|---|---|
| | B-37 | B-38 | B-39 | B-40 | B-41 | B-42 |
| Dicarboxylic acid component: | | | | | | |
| Terephthalic acid | 54 | 70 | 35 | 55 | 40 | 42 |
| Isophthalic acid | 43 | 25 | 32 | 45 | 38 | 37 |
| 5-Sodium sulfo-isophthalic acid | 3 | 5 | 3 | — | 22 | 21 |
| Adipic acid | — | — | 30 | — | — | — |
| Glycol component: | | | | | | |
| Ethylene glycol | 45 | 60 | 50 | 46 | — | 55 |
| Neopentyl glycol | 55 | 39.5 | — | 54 | — | 45 |
| 1,4-Cyclohexane-dimethanol | — | — | — | — | — | — |
| Polyethylene-glycol (MW = 4000) | — | 0.5 | — | — | — | — |
| Diethylene glycol | — | — | — | — | 100 | — |
| DA-350 | — | — | 50 | — | — | — |
| Properties: | | | | | | |
| Molecular weight | 15000 | 17000 | 14000 | 14000 | 7500 | 6700 |
| Softening point (°C.) | 157 | 156 | 175 | 153 | 102 | 135 |

EXAMPLE 1

Polyester resin (B-1) (300 parts) and n-butyl cellosolve (140 parts) were charged into a vessel and were agitated at 150° to 170° C. for about 3 hours to give a homogeneous, viscous mixture. To the mixture was gradually added with vigorous agitation water (560 parts) over a period of about one hour to give a faint bluish white aqueous dispersion (X-1). The aqueous dispersion had a particle size of less than 1μ. When this aqueous dispersion was allowed to stand at −5° C. for 20 days, no change of appearance and viscosity was observed, and the aqueous dispersion showed excellent storage stability.

The aqueous dispersion (X-1) was coated onto a polyethylene terephthalate film (thickness: 125μ) with a bar coater #20 in a thickness of 10μ (in dry state) and then dried at 100° C. for 20 minutes. The resulting coating layer had very excellent adhesion, and even when it was dipped in water, it showed excellent water resistance without showing any blushing.

EXAMPLES 2 to 5

In the same manner as described in Example 1 except that the starting materials as shown in Table 9 were used, there were prepared some aqueous dispersions (X-2 to X-5), properties of which are shown in Table 10.

The aqueous dispersions (X-2 and X-5) were coated onto a polyethylene terephthalate film (thickness: 125μ) in the same manner as in Example 1. The properties of the resulting coating layers as well as those of Example 1 are shown in Table 11.

REFERENCE EXAMPLES 1 to 5

In the same manner as described in Example 1 except that the starting materials as shown in Table 9 were used, there were prepared some aqueous dispersions (X-6 to X-10), properties of which are shown in Table 10.

The aqueous dispersions (X-7 to X-9) were coated onto a polyethylene terephthalate film (thickness: 125μ) in the same manner as described in Example 1. The properties of the resulting coating layers are also shown in Table 11.

TABLE 9

| Starting materials | Example No. | | | | | Reference Example No. | | | | |
|---|---|---|---|---|---|---|---|---|---|---|
| (part) | 1 | 2 | 3 | 4 | 5 | 1 | 2 | 3 | 4 | 5 |
| Aqueous dispersion | X-1 | X-2 | X-3 | X-4 | X-5 | X-6 | X-7 | X-8 | X-9 | X-10 |
| Polyester resin | (B-1) | (B-2) | (B-3) | (B-4) | (B-2) | (B-5) | (B-6) | (B-7) | (B-1) | (B-8) |
|  | 300 | 300 | 400 | 400 | 200 | 300 | 300 | 300 | 100 | 200 |
| n-Butyl cellosolve | 140 | 140 | 80 | 90 | 60 | 140 | — | 140 | — | — |
| Ethyl cellosolve | — | — | — | — | 50 | 40 | — | — | — | — |
| Ethanol | — | — | 20 | — | — | — | — | — | — | — |
| Surfactant* | — | — | — | — | — | — | — | — | — | 4 |
| Water | 560 | 560 | 500 | 560 | 700 | 560 | 700 | 560 | 900 | 700 |

*Surfactant: Noniolite AL-20 (made by Kyoeisha Yushi)

TABLE 10

| Properties of aqueous dispersions | | Example No. | | | | | Reference Example No. | | | | |
|---|---|---|---|---|---|---|---|---|---|---|---|
|  |  | 1 | 2 | 3 | 4 | 5 | 1 | 2 | 3 | 4 | 5 |
| Aqueous dispersion | | X-1 | X-2 | X-3 | X-4 | X-5 | X-6 | X-7 | X-8 | X-9 | X-10 |
| Dispersibility | State of dispersion* | O | O | O | O | O | X | O | Δ | Δ | O |
|  | Particle size(μ) | <1 | <1 | <1 | <1 | <1 | — | <10 | <2000 | <2000 | <1 |
| Storage stability (−5° C., 20 days) | Change of appearance | No change | No change | No change | No change | No change | — | Frozen | Separated | Frozen separated | Frozen separated |
|  | Change of particle size** | No change | No change | No change | No change | No change | — | Aqueous dispersion could not be recovered | — | — | — |
|  | Change of viscosity (cps)** | <100 | <100 | <100 | <100 | <100 | — |  | — | — | — |

*O: Excellent dispersibility (faint bluish white aqueous dispersion),
Δ: Inferior dispersibility (white turbid dispersion was obtained, but it had wide range of particle distribution),
X: Entirely not dispersed (separated)
**They were evaluated after being allowed to stand at 25° C. for 24 hours.

TABLE 11

| Properties of coating layer | | | Example No. | | | Reference Example No. | | |
|---|---|---|---|---|---|---|---|---|
|  |  |  | 1 | 2 | 5 | 2 | 3 | 4 |
| Aqueous dispersion | | | X-1 | X-2 | X-5 | X-7 | X-8 | X-9 |
| Appearance | | | Excellent | Excellent | Excellent | Excellent | Bad* discontinuous layer | Bad, uneven thickness |
| Adhesion | | | 100/100 | 100/100 | 100/100 | 100/100 | Impossible to measure | 94/100 |
| Water resistance** (25° C., 3 days) | After dipping | Adhesion | 100/100 | 100/100 | 100/100 | 45/100 |  | 93/100 |
|  |  | Appearance | No change | No change | No change | Blushing | | No change |
|  | After | Adhe- | 100/100 | 100/100 | 100/100 | Dis- |  | 93/100 |

TABLE 11-continued

| Properties of coating | Example No. | | | Reference Example No. | | |
|---|---|---|---|---|---|---|
| layer | 1 | 2 | 5 | 2 | 3 | 4 |
| dipping (60° C., 2 hours) sion Appearance | No change | No change | No change | solved out | | No change |

*When it was coated and dired, it crystallized and no continuous layer was formed.
**It was evaluated after being dipped in water, followed by wiping up water.

EXAMPLES 6 to 8

To the aqueous dispersion (X-1, X-3 or X-5) (each 100 parts) were added to a melamine resin (Sumimal M-50, made by Sumitomo Chemical Co.) (10 parts) and a 50% by weight solution (0.5 part) of a silicone compound (XF-3913, made by Toshiba Silicone Co.) in ethanol, and the mixture was agitated well to give a homogeneous varish. The resulting varnish was coated onto a polyethylene terephthalate film (thickness 100μ) with a bar coater #26 in a thickness of 10μ(in dry state) and baked at 100° C. for 30 minutes to give a hardened coating layer, properties of which are shown in Table 12.

REFERENCE EXAMPLES 6 and 7

In the same manner as described in the above Examples 6 to 8 except that the aqueous dispersions (X-7 and X-10) were used, hardened coating layers were formed on a polyethylene terephthalate film (thickness: 125μ). The properties thereof are also shown in Table 12.

TABLE 12

| Example No. | Adhesion | Tackiness of surface | Solvent Resistance (times) | Water resistance (25° C., days) | |
|---|---|---|---|---|---|
| | | | | Adhesion | Appearance |
| Ex. 6 | 100/100 | No | >50 | 100/100 | No change |
| Ex. 7 | 100/100 | No | >50 | 100/100 | " |
| Ex. 8 | 100/100 | No | >50 | 100/100 | " |
| Ref. Ex. 6 | 100/100 | Yes | 35 | 60/100 | Blushing |
| Ref. Ex. 7 | 100/100 | No | >50 | 40/100 | Blushing |

EXAMPLES 9 and 10

To the aqueous dipersion (X-1 or X-3) (each 100 parts) were added a melamine resin (Suminal M-50, made by Sumitomo Chemical) (10 parts), a 50% by weight solution (0.5 part) of a silicone compound (XF-3913, made by Toshiba Silicone) in ethanol and titanium oxide (10 parts), and the mixture was mixed with agitation and then kneaded with a three-roll mill to give a white composition. The resulting composition was coated onto a soft steel panel with a bar coater #26 in a thickness of 10μ(in dry state) and baked at 150° C. for 10 minutes. The properties of the resulting coating layer are shown in Table 13.

REFERENCE EXAMPLES 8 and 9

In the same manner as described in Examples 9 and 10 except that the aqueous dispersions (X-7 and X-10) were instead of aqueous dispersion (X-1), there was formed a coating layer, properties of which are also shown in Table 13.

TABLE 13

| Properties | Example No. | | Reference Example No. | |
|---|---|---|---|---|
| | 9 | 10 | 8 | 9 |
| Erichsen value (mm) | >7 | >7 | >7 | 6 |
| Adhesion | 100/100 | 100/100 | 100/100 | 100/100 |
| Weatherability (degree of retention of gloss, %) | 72 | 78 | 18 (chalking) | 46 |
| Water resistance (50° C., 150 hrs.) Degree of retention of gloss (%) | 97 | 98 | 45 | 40 |
| Adhesion | 100/100 | 100/100 | 55/100 | 34/100 |

EXAMPLE 11

In the same manner as described in Preparation 1, there was produced a polyester resin (B-43) which was composed of terephthalic acid: 68% by mole, isophthalic acid: 20% by mole, 5-sodium sulfoisophthalic acid: 3% by mole, ethylene glycol: 40% by mole and neopentyl glycol: 60% by mole, and had a softening point of 135° C. and a molecular weight of 16,000.

In the same manner as described in Example 1 except that the polyester resin (B-43) was used instead of the polyester resin (B-1), there was prepared and aqueous dispersion (X-11), and the aqueous dispersion (X-11) was coated onto a polyethylene terephthalate film (thickness: 125μ) to form a coating layer. The properties of the aqueous dispersion and coating layer are shown in Table 14.

TABLE 14

| Properties of aqueous dispersion and coating layer | | | Example 11 |
|---|---|---|---|
| Aqueous dispersion | | | X-11 |
| Properties of aqueous dispersion | Dispersibility | State of dispersion* | o |
| | | Particle size (μ) | <1 |
| | Storage stability (−5° C. 20 days) | Change of appearance | No change |
| | | Change of particle size | No change |
| | | Change of viscosity (cps) | <100 |
| Properties of coating layer | Appearance | | Excellent |
| | Adhesion | | 100/100 |
| | Water resistance | After dipping (25° C. 3 days) | Adhesion 100/100 |
| | | | Appearance No change |
| | | After dipping (60° C. 2 hrs.) | Adhesion 100/100 |
| | | | Appearance No change |

*O: Excellent dispersibility (faint bluish white aqueous dispersion)

EXAMPLE 12

In the same manner as described in Example 7 except that the aqueous dispersion (X-11) was used instead of the aqueous dispersion (X-1), there were prepared a coating composition and a coating layer. The properties of the coating layer are shown in Table 15.

TABLE 15

| Properties of coating layer | | Example 12 |
|---|---|---|
| Erichsen value (mm) | | >7 |
| Adhesion | | 100/100 |
| Weatherability (degree of retention of gloss, %) | | 70 |
| Water resistance (50° C., 150 hrs) | Degree of retention of gloss (%) | 95 |
| | Adhesion | 100/100 |

EXAMPLE 13

The crystalline polyester resin (A-1) (120 parts, the non-crystalline polyester (B-9) (180 parts) and n-butyl cellosolve (140 parts) were charged into a vessel and the mixture was agitated at 150° to 170° C. for about 3 hours to give a homogeneous viscous mixture. To the mixture was gradually added with vigorous agitation water (560 parts (over a period of about one hour to give a faint bluish white aqueous dispersion (X-1). The aqueous dispersion had a particle size of less than 1μ. When this aqueous dispersion was allowed to stand at −5° C. for one month, no change of appearance was observed, and the aqueous dispersion showed excellent storage stability.

The aqueous dispersion (X-12) was coated onto a polyethylene terephthalate film (thickness: 125μ) with a bar coater #20 in a thickness of 10μ (in dry state and then dried at 100° C. for 20 minutes. The resulting coating layer had very excellent adhesion, and even when it was dipped in water for 7 days, and further even when it was dipped in a hot water of 60° C. for one day, it showed excellent water resistance without showing any blushing.

EXAMPLES 14 to 16 AND REFERENCE EXAMPLES 10 to 16

In the same manner as described in Example 13 except that the starting materials as shown in Table 16 were used, there were prepared aqueous dispersions (X-13 to X-22), and further coating layers therefrom. The properties of the aqueous dispersions and coating layers are shown in Table 17 and Table 18, respectively.

TABLE 16

| Starting materials (part) | Example No. | | | Reference Example No. | | | | | | |
|---|---|---|---|---|---|---|---|---|---|---|
| | 14 | 15 | 16 | 10 | 11 | 12 | 13 | 14 | 15 | 16 |
| Aqueous dispersion | X-13 | X-14 | X-15 | X-16 | X-17 | X-18 | X-19 | X-20 | X-21 | X-22 |
| Crystalline polyester resin | A-1 | A-2 | A-3 | A-1 | A-1 | A-1 | A-1 | A-1 | A-1 | A-1 |
| | 60 | 180 | 150 | 120 | 120 | 300 | 80 | 80 | 150 | 150 |
| Non-crystalline polyester resin | B-10 | B-10 | B-9 | B-11 | B-12 | — | B-9 | B-9 | B-13 | B-9 |
| | 140 | 120 | 150 | 180 | 180 | | 120 | 120 | 150 | 150 |
| n-Butyl cellosolve | — | — | 140 | 140 | 140 | 140 | — | — | 140 | — |
| Ethyl cellosolve | — | 100 | — | — | — | — | — | — | — | — |
| Dioxane | 80 | 40 | — | — | — | — | — | — | — | — |
| Isopropanol | 80 | — | — | — | — | — | — | — | — | — |
| Surfactant* | — | — | — | — | — | — | — | 4 | — | — |
| Water | 640 | 560 | 560 | 560 | 560 | 560 | 560 | 800 | 560 | 700 |

*Noniolite AL-20, made by Kyoeisha Yushi Kagaku Kogyo K.K.

TABLE 17

| Properties of aqueous dispersion | | Example No. | | | Reference Example No. | | | | | | |
|---|---|---|---|---|---|---|---|---|---|---|---|
| | | 14 | 15 | 16 | 10 | 11 | 12 | 13 | 14 | 15 | 16 |
| Aqueous dispersion | | X-13 | X-14 | X-15 | X-16 | X-17 | X-18 | X-19 | X-20 | X-21 | X-22 |
| Dispersibility | State of dispersion* | O | O | O | O | O | X | X | O | X | X |
| | Particle size (μ) | <1 | <1 | <1 | <1 | <1 | >100 | >100 | <1 | >100 | >100 |
| Storage stability (−5° C., 1 month) | Change of appearance | No change | No change | No change | No change | No change | Separated | Separated | Frozen, separated | Separated | Separated |
| | Change of particle** | No change | No change | No change | No change | No change | — | — | — | — | — |

*O: Excellent dispersibility (faint bluish white aqueous dispersion), Δ: Inferior dispersibility (white turbid dispersion was obtained, but it had wide range of particle distribution), X: Entirely not dispersed (separated)
**It was evaluated after being allowed to stand at 25° C. for 24 hours.

TABLE 18

| Properties of coating layer | | | Example No. | | | Reference Example No. | | | | | | |
|---|---|---|---|---|---|---|---|---|---|---|---|---|
| | | | 14 | 15 | 16 | 10 | 11 | 12 | 13 | 14 | 15 | 16 |
| Aqueous dispersion | | | X-13 | X-14 | X-15 | X-16 | X-17 | X-18 | X-19 | X-20 | X-21 | X-22 |
| Appearance | | | Excellent | Excellent | Excellent | Excellent | Excellent | Bad | Bad | Bad | Bad | Bad |
| Adhesion | | | 100/100 | 100/100 | 100/100 | 100/100 | 100/100 | Impossible to measure | Impossible to measure | 92/100 | Impossible to measure | Impossible to measure |
| Water resistance | After dipping (25° C., 7 days) | Adhesion | 100/100 | 100/100 | 100/100 | 75/100 | 80/100 | | | 90/100 | | |
| | | Appearance | No change | No change | No change | Blushing | Blushing | | | No change | | |
| | After dipping (60° C., 1 day) | Adhesion | 100/100 | 100/100 | 100/100 | 0/100 | 25/100 | | | 86/100 | | |
| | | Appearance | No change | No change | No change | Blushing | Blushing | | | Slightly blush- | | |

TABLE 18-continued

| Properties of coating layer | Example No. | | | Reference Example No. | | | | | |
|---|---|---|---|---|---|---|---|---|---|
| | 14 | 15 | 16 | 10 | 11 | 12 | 13 | 14 | 15 | 16 |
| | | | | | | | | | ing |

EXAMPLE 17

The crystalline polyester resin (A-1) (150 parts), the non-crystalline polyester resin (B-9) (150 parts), and n-butyl cellosolve (140 parts) were charged into a vessel and were agitated at 150° to 170° C. for about 3 hours to give a homogeneous viscous mixture. To the mixture was gradually added with vigorous agitation water (560 parts ) over a period of about one hour to give a homogeneous, faint bluish white aqueous dispersion. To this aqueous dispersion was added a methylated melamine resin (Sumimal M-50 W, made by Sumitomo Chemical Co.) (45 parts), and the mixture was agitated by give a homogeneous aqueous dispersion (X-23). This aqueous dispersion had a particle size of less than 1μ, and when it was allowed to stand at −5° C. for one month, no change of appearance was observed, and the aqueous dispersion showed excellent storage stability.

The aqueous dispersion (X-23) was coated onto a polyethylene terephthalate film (thickness: 125μ) with a bar coater in a thickness of 10μ (in dry state) and the coating layer was hardened at 100° C. for 30 minutes and then dried. The coating layer thus formed had an excellent adhesion as 100/100, and excellent water resistance. That is, even when it was dipped in water for 7 days and further even when it was dipped in hot water of 60° C. for one day, it did not show any blushing.

EXAMPLES 18 TO 21 AND REFERENCE EXAMPLE 17 TO 21

The aqueous dispersions prepared in Example 13 to 15 and 17 and Reference Examples 10 to 14 were each coated onto a suede cloth of 100% polyester with a bar coater #20 and then dried at room temperaure for 24 hours. The coated cloths were piled up by facing each coated surface and bonded at 150° C., under pressure of 300 g/cm² for 10 minutes. The adhesion (peal strength) of the bonded cloths was measured with an Instrone type peel strength tester (made by Shimazu Seisakusho). Besides, the bonded cloths were dipped in hot water of 60° C. for one day, and the adhesion (peal strength) was also measured, and the retention thereof was calculated. The results are shown in Table 19.

agitated for about one hour to give a homogeneous faint bluish white aqueous dispersion (X-24).

The aqueous dispersion (X-24 ) was coated into a steel panel coated with a melamine alkyd resin (Amilac red, made by Kansai Paint Co.) with a cup gun in a thickness of 30 μ and dried at 100° C. for 10 minutes.

When this product was subjected to a peel strength test at 180°, it showed a peel strength of 60 g/cm and could easily be peeled off with hand. When this test piece was dipped in hot water of 40° C. for 300 hours, the peelable paint composition did not show any dissolution, swelling, cracking and peeling, and when it was subjected to peel strength test, it showed a peel strength of 50 g/cm and could easily be peeled off with hand. Moreover, after this sample was irradiated with a sunshine weather-ometer for 100 hours and further exposed outdoor for 3 months, it was tested likewise. As the result, there was observed no deterioration such as softening or cracking, and the peel strengths in each test were 36 g/cm and 50 g/cm, respectively.

Besides, the melamine alkyd paint which was coated to the steel panel had an initial gloss of 94, and the gloss thereof was still 94 even after subjected to tests for water resistance and weatherability, which means that this peelable paint composition of the example does not show any bad effect on the coating layer of the malamine alkid paint but rather shows protective effect. When the peelable paint composition was not coated, the melamine alked paint-coated steel panel showed a gloss of 94 after being subjected to water resistance, a gloss of 92 after irradiation with a sunshine weatherometer, and a gloss of 92 after being exposed outdoor.

In the same manner as described above, various aqueous dispersions were prepared by using polyester resins as shown in Table 20, and the aqueous dispersions were tested. The results are shown in Table 21.

TABLE 20

| Aqueous dispersion and dispersibility thereof | Example 22 | Reference Example No. | | |
|---|---|---|---|---|
| | | 22 | 23 | 24 |
| Aqueous dispersion | X-24 | X-25 | X-26 | — |
| Polyester resin | B-15 | B-16 | B-17 | B-15 |
| (part) | 300 | 300 | 150 | 300 |

TABLE 19

| Properties | Example No. | | | | Reference Example No. | | | | |
|---|---|---|---|---|---|---|---|---|---|
| | 18 | 19 | 20 | 21 | 17 | 18 | 19 | 20 | 21 |
| Aqueous dispersion | X-12 | X-13 | X-14 | X-23 | X-16 | X-17 | X-18 | X-19 | X-20 |
| Initial Adhesion (kg/cm) | 1.2 | 0.87 | 0.94 | 1.6 | 1.1 | 0.22 | Impossible to coat | Impossible to coat | 0.88 |
| Adhesion (kg/cm) after dipping at 60° C. for 1 day | 1.0 | 0.74 | 0.80 | 1.4 | 0.64 | 0.08 | | | 0.47 |
| Retention (%) | 83 | 85 | 85 | 88 | 58 | 36 | | | 53 |

EXAMPLE 22

The polyester resin (B-15) (300 parts was mixed into n-butyl cellosolve (70 parts), and the mixture was added with vigorous agitation into a mixture of isopropanol (70 parts) and water (506 parts), and the mixture was

| | | | | B-18 150 |
|---|---|---|---|---|
| n-Butyl cellosolve (part) | 70 | 70 | 70 | — |
| Isopropanol (part) | 70 | 70 | 70 | — |
| Methyl ethyl ketone (part) | — | — | — | 700 |
| Water (part) | 560 | 560 | 560 | — |
| Dispersibility | Excel- | Bad | Excel- | Excel- |

TABLE 20-continued

| Aqueous dispersion and dispersibility thereof | Example 22 | Reference Example No. | | |
|---|---|---|---|---|
| | | 22 | 23 | 24 |
| | lent | | lent | lent |

TABLE 21

| Properties of peelable paint composition | | Example 22 | Reference Example No. | | |
|---|---|---|---|---|---|
| | | | 22 | 23 | 24 |
| Aqueous dispersion | | X-24 | X-25 | X-26 | — |
| Initial gloss (%) of melamine alkyd paint | | 94 | | 94 | 94 |
| Initial peel strength (g/cm) | | 60 | Hardly coated | Hardly peeled | 130* |
| Water resistance | Change of appearance | No change | | Cracking | No change |
| | Peel strength (g/cm) | 50 | | Hardly peeled | 105 |
| Sunshine weatherometer | Change of appearance | No change | | Cracking | No change |
| | Peel strength (g/cm) | 36 | | Hardly peeled | 90 |
| | Gloss of coating layer (%) | 92 | | — | 82 |
| Exposed outdoor | Change of appearance | No change | | Cracking | No change |
| | Peel strength (g/cm) | 50 | | Hardly peeled | 95 |
| | Gloss of coating layer (%) | 92 | | — | 84 |

*It was difficult to completely peel the coating layer, since a part of the coating layer was broken by peeling thereof.

EXAMPLE 23

The polyester resin (B-19) (300 parts) and n-butyl cellosolve (140 parts) were charged into a vessel and agitated at 150° to 170° C. for about 3 hours to give a homogeneous viscous mixture. To the mixture was gradually added with vigorous agitation water (560 parts) over a period of about one hour to give a faint bluish white aqueous dispersion (X-27).

To the aqueous dispersion (X-27) was added a water-soluble melamine resin (Sumimal M-50W, made by Sumitomo Chemical Co.) (35 parts), and the mixture was mixed well to give a homogeneous aqueous dispersion. This dispersion was coated onto a cold-rolled steel panel (thickness: 0.8 mm) treated with zinc phosphate with a roll coater in a thickness of 10μ, dried at 100° C. for 5 minutes and then cured at 240° C. for one minute. Onto this layer thus formed was coated the polyester resin (P-1) at 240° C. with an extruder in a thickness of 50μ to give a coated steel panel. Properties of this coated steel panel were tested. As a result, it showed excellent mechanical strength, water resistance and anticorrosion, as shown in Table 22.

EXAMPLE 24

In the same manner as described in Example 23, the polyester resin (B-20) (300 parts) was dissolved in n-butyl cellosolve (80 parts) and cyclohexanone (60 parts), and thereto was gradually added water (560 parts) to give an aqueous dispersion (X-28).

To the aqueous dispersion (X-28) were added a water-soluble melamine resin (Sumimal M-50W) (45 parts) and a homogeneous dispersion (100 parts) of titanium oxide (50% by weight as solid component) in ethylene glycol. The resulting homogeneous mixture was coated onto a cold-rolled steel panel (thickness: 0.8 mm) treated with zinc phosphate in a thickness of 10μ, dried at 100° C. for 5 minutes and then cured at 240° C. for one minute.

Onto the coating layer thus formed was coated polyester resin (P-1) which was previously mixed with 20% by weight of titanium oxide with an extruder at 220° C. in a thickness of 70μ to give a coated steel panel. Properties of this coated steel panel were tested. As a result, it showed excellent mechanical strength, water resistance and anticorrosion, as shown in Table 22.

EXAMPLE 25

In the same manner as described in Example 23, the polyester resin (B-21) (300 parts) was dissolved in n-butyl cellosolve (70 parts) and butyl acetate (30 parts), and thereto was gradually added water (600 parts) to give an aqueous dispersion (X-29).

To the aqueous dispersion (X-29) was added a water-soluble melamine resin (Sumimal M-50W) (40 parts). The resulting homogeneous mixture was coated onto a cold-rolled steel panel (thickness: 0.8 mm) with a bar coater in a thickness of 6μ, dried at 100° C. for 5 minutes and then cured at 240° C. for one minute.

Onto the coating layer thus formed was coated a powder coating composition which was prepared by mixing the polyester resin (P-3) (1000 parts), a crosslinking agent (U-I, made by Bayer) (220 parts), titanium oxide (400 parts), polyflow (made by Kyoeisha Yushi Kagaku Kogyo) (5 parts) and dibutyl tin dilaurate (3 parts) and pulverizing the mixture. The coating was carried out with an electrostatic coating machine in a thickness of 50μ and then the coating layer was cured at 180° C. for 20 minutes to give a coated steel panel. Properties of this coated steel panel were tested. As a result, it showed excellent mechanical strength, water resistance and anticorrosion, as shown in Table 22.

REFERENCE EXAMPLE 25

Without coating any aqueous dispersion, the polyester resin (P-2) was coated onto a cold-rolled steel panel (thickness: 0.8 mm) treated with zinc phosphate with an extruder at 240° C. in a thickness of 50μ to give a coated steel panel. Properties of this coated steel panel were tested. As a result, it did not show sufficient adhesion and it was inferior in the anticorrosion, too.

REFERENCE EXAMPLE 26

In the same manner as described in Example 23, the polyester resin (B-22) (300 parts) was dissolved in n-butyl cellosolve (140 parts), and thereto was gradually added water (560 parts). However, the polyester resin coagulated and there could not be obtained any stable aqueous dispersion, and the mixture could not be coated onto a steel panel.

REFERENCE EXAMPLE 27

In the same manner as described in Example 23, the polyester resin (B-23) (300 parts) was dissolved in hot water of 70° to 90° C. (700 parts), and the mixture was agitated for about 3 hours to give a homogeneous aqueous dispersion (X-30).

To the aqueous dispersion (X-30) was added a water-soluble melamine resin (Sumimal M-50 W) (35 parts), and the resulting homogeneous mixture was coated onto a cold-rolled steel panel (thickness; 0.8 mm) treated with zinc phosphate with a roll coater in a thickness of 10μ, dried at 100° C. for 5 minutes, and then cured at 240° C. for one minute.

Onto the coating layer thus formed was coated the polyester resin (P-2) with an extruder at 240° C. in a thickness of 50μ to give a coated steel panel. Properties of this coated steel panel were tested. As a result, it showed insufficient water resistance and anticorrosion, as shown in Table 22.

TABLE 22

| Properties of coating layer | Example No. | | | Reference Example No. | | |
|---|---|---|---|---|---|---|
| | 23 | 24 | 25 | 25 | 36 | 27 |
| Apperance | Excellent | Excellent | Excellent | Good | Impossible to coat | Excellent |
| Adhesion | 100/100 | 100/100 | 100/100 | 0/100 | | 100/100 |
| Erichsen value (mm) | 7< | 7< | 7< | 7< | | 7< |
| Water resistance* | 100/100 | 100/100 | 100/100 | 0/100 | | 0/100 |
| Anticorrosion** (mm) | 1> | 1> | 1> | 4.5 | | 3.2 |

*It was evaluated after being kept at 50° C. for 300 hours.
**It was evaluated in account of the width corroded after being dipped in water at 40° C. for 500 hours.

EXAMPLES 26 AND 27 AND REFERENCE EXAMPLES 28 TO 30

The polyester resins (B-24 to B-28) were each added to a mixture of water and isopropanol (and n-butyl cellosolve or tert-butyl cellosolve in Examples 26 and 27) in an amount as shown in Table 23, and the mixture was mixed at 70° to 75° C. for 3 hours to give aqueous binders for printing ink, which had a particle size of less than 1μ. After these binders were kept at 0° C. for one month, the state of dispersion was observed. The results are shown in Table 23.

The binders (aqueous dispersion) thus formed (100 parts), titanium oxide (15 parts) and a 50% by weight solution (0.5 part) of a silicone compound (XF-3913, made by Toshiba Silicone Co.) were mixed with a ball mill to give a white aqueous ink. This ink was coated onto a polyethylene terephthalate film (thickness: 125μ) with a bar coater #20 in the thickness of 7μ and dried at 70° C. for 2 minutes. The properties of the coating layer were measured. The results are shown in Table 23.

TABLE 23

| Components (% by weight) | Example No. | | Reference Example No. | | |
|---|---|---|---|---|---|
| | 26 | 27 | 28 | 29 | 30 |
| Polyester resin B-24 | 35 | — | — | — | — |
| Polyester resin B-25 | — | 35 | — | — | — |
| Polyester resin B-26 | — | — | 30 | — | — |
| Polyester resin B-27 | — | — | — | 30 | — |
| Polyester resin B-28 | — | — | — | — | 30 |
| Isopropanol | 10 | 8 | 14 | 14 | 14 |
| n-Butyl cellosolve | 3 | — | — | — | — |
| tert-Butyl cellosolve | — | 4 | — | — | — |
| Water | 52 | 53 | 56 | 56 | 56 |
| Dispersibility | Excellent | Excellent | Bad | Excellent | Excellent |
| Gloss | 86 | 85 | — | 82 | 78 |
| Antiblocking | Excellent | Excellent | — | Bad | Bad |
| Adhesion | 100/100 | 100/100 | — | 100/100 | 25/100 |
| Water resistance* | No change | No change | — | Losing gloss | Losing gloss |

*After being dipped in water at 30° C. for one day; the appearance was observed.

EXAMPLE 28

The polyester resin (B-29) (300 parts) and n-butyl cellosolve (140 patts) were charged into a vessel and were agitated at 150° to 170° C. for about 3 hours to give a viscous mixture. To the mixture was gradually added with vigorous agitation water (560 parts) over a period of about one hour to give a homogeneous, faint bluish white aqueous dispersion. To this aqueous dispersion (100 parts) was added an amino resin (Sumimal M-50W, made by Sumitomo Chemical Co., in the form of a 80% by weight aqueous solution) (20 parts) to give an aqueous binder for coating which contained the polyester resin (B-29): 25% by weight, the amino resin: 13% by weight, a water compartible organic compound: 12% by weight, and water: 50% by weight.

The aqueous binder was allowed to stand at 0° C. and 40° C. for one month, but any change of appearance was not observed.

To the aqueous binder (100 parts) were added a homogeneous dispersion of titanium oxide in ethylene glycol (solid content: 50% by weight) (40 parts) and a 50% by weight solution (0.5 part) of a painting additive (XF-3913, made by Toshiba Silicone Co.) in ethanol, and the mixture was mixed well to give an aqueous coating composition.

The aqueous coating composition was coated onto a cold-rolled steel panel treated with zinc phosphate with a bar coater #36 in a thickness of 20μ, dried at 150° C. for 2 minutes and baked at 250° C. for 2 minutes. The coating layer thus formed had excellent gloss and smoothness and further had a pencil hardness: 2H, Erichsen value: more than 7 mm, and adhesion: 100/100, an adhesion after testing the water resistance for 300 hours: 100/100, a width corroded after testing anticorrosion for 300 hours: 2.5 mm, and a degree of retention of gloss after testing boiling water resistance: 95%.

EXAMPLES 29 to 31 AND REFERENCE EXAMPLES 31 TO 33

In the same manner as described in Example 28, various aqueous binders were prepared by using the starting materials as shown in Table 24. Properties of the aqueous binders are shown in Table 24.

By using these aqueous binders there were prepared aqueous coating compositions which were coated onto a cold-rolled steel panel likewise to form coating layers. Properties of the coating layers are shown in Table 25.

TABLE 24

| Components (% by weight) | Example No. | | | | Reference Example No. | | |
|---|---|---|---|---|---|---|---|
| | 28 | 29 | 30 | 31 | 31 | 32 | 33 |
| Polyester resin | B-29 | B-30 | B-31 | B-32 | B-33 | B-34 | B-35 |

TABLE 24-continued

| Components | Example No. | | | | Reference Example No. | | |
|---|---|---|---|---|---|---|---|
| (% by weight) | 28 | 29 | 30 | 31 | 31 | 32 | 33 |
| Amino resin | 25 | 30 | 40 | 35 | 25 | 25 | 25 |
| | 13 | 15 | 10 | 12 | 13 | 13 | 13 |
| Organic compounds compatible with water: | | | | | | | |
| n-Butyl cellosolve | 12 | 4 | 5 | 6 | 12 | 12 | 12 |
| t-Butyl cellosolve | — | 4 | — | — | — | — | — |
| Cyclohexanone | — | — | 5 | — | — | — | — |
| Isopropanol | — | — | — | 4 | — | — | — |
| Water | 50 | 47 | 40 | 43 | 50 | 50 | 50 |
| State of Dispersion in water | Excellent | Excellent | Excellent | Excellent | Inferior | Excellent | Excellent |
| Storage stability at 0° C. | Excellent | Excellent | Excellent | Excellent | — | Excellent | Excellent |
| at 40° C. | Excellent | Excellent | Excellent | Excellent | — | Excellent | Excellent |

TABLE 25

| Properties of coating layer | Example No. | | | | Reference Example No. | | |
|---|---|---|---|---|---|---|---|
| | 28 | 29 | 30 | 31 | 31 | 32 | 22 |
| Smoothness | Excellent | Excellent | Excellent | Excellent | Hardly coated | Excellent | Good |
| Pencil hardness | 2H | H | H | F | | 2H | 2B |
| Gloss | 92 | 86 | 87 | 87 | | 74 | 65 |
| Erichsen value (mm) | >7 | >7 | >7 | >7 | | >7 | >7 |
| Adhesion | 100/100 | 100/100 | 100/100 | 100/100 | | 100/100 | 100/100 |
| Adhesion after testing of water resistance | 100/100 | 100/100 | 100/100 | 100/100 | | 0/100 | 100/100 |
| Anticorrosion (mm) | 2.5 | 3.0 | 1.5 | 3.0 | | 5.0 | >10 |
| Degree of retention of gloss after testing of boiling water resistance | 90 | 85 | 88 | 85 | | 45 | 20 |

EXAMPLE 32

The polyester resin (B-37) (200 parts) and n-butyl cellosolve (50 parts) were charged into a vessel and were agitated at 150° to 170° C. for about 3 hours to give a viscous mixture. To the mixture was gradually added with vigorous agitation water (750 parts) over a period of about one hour to give a homogeneous, faint bluish white aqueous dispersion.

To the aqueous dispersion (1,000 parts) were added a 10% by weight aqueous solution (300 parts) of a nonionic surfactant (Nissan Nonione E-230, made by Nihon Yushi) and a 10% by weight aqueous solution (150 parts) of polyvinyl alcohol (GL-05, made by Nihon Gosei) to obtain a treating agent for giving drip-proof.

When this treating agent was allowed to stand at 40° C. for 2 months, any change of appearance was observed.

This treating agent was coated onto a polyethylene terephthalate film (thickness: 25μ) with a bar coater #18 in a thickness of 2μ (in dry state), and dried at 105° C. for 5 minutes. The coating layer thus formed had excellent drip-proof properties and had an adhesion: 100/100, adhesion after washing with water for one hour: 100/100, and further no change of transparency and drip-proof properties was observed.

EXAMPLES 33 AND 34 AND REFERENCE EXAMPLES 34 TO 36

In the same manner as described in Example 32, various treating agents for giving drip-proof were prepared by using the starting materials as shown in Table 26. The treating agents were coated onto a polyethylene terephthalate film to form a coating layer, likewise. The properties of the coating layer are shown in Table 27.

TABLE 26

| Components (part by weight) | Example No. | | | Reference Example No. | | |
|---|---|---|---|---|---|---|
| | 32 | 33 | 34 | 34 | 35 | 36 |
| Polyester resin | B-37 | B-38 | B-39 | B-40 | B-41 | B-42 |
| | 200 | 200 | 200 | 200 | 200 | 200 |
| Nonionic surfactant: | | | | | | |
| Nissan Nonione E-230 | 30 | 40 | — | — | 25 | 25 |
| Nissan Nonione S-15.4 | — | — | 25 | — | — | — |
| Polyvinyl alcohol | 15 | — | 10 | — | — | — |
| Water soluble organic compounds: | | | | | | |
| n-Butyl cellosolve | 50 | 50 | 60 | 60 | — | — |
| Isopropanol | — | — | — | — | — | 50 |
| Water | 1155 | 1110 | 1055 | 740 | 950 | 975 |
| State of dispersion in water | Excellent | Excellent | Excellent | Inferior | Excellent | Excellent |
| Stability (40° C., 2 months) | Excellent | Excellent | Excellent | — | Excellent | Excellent |

TABLE 27

| Properties of coating layer | | Example No. | | | Reference Example No. | |
|---|---|---|---|---|---|---|
| | | 32 | 33 | 34 | 35 | 36 |
| Clouding* (%) | | 1 | 1 | 1 | 1 | 2 |
| Dip-proof properties | | Excellent | Excellent | Excellent | Excellent | Excellent |
| Adhesion | | 100/100 | 100/100 | 100/100 | 100/100 | 70/100 |
| After washing with flowing water for 1 hour | Drip-proof properties | Excellent | Excellent | Excellent | Dissolved | Peeled |
| | Adhesion | 100/100 | 100/100 | 100/100 | | |
| | Clouding (%) | 1 | 1 | 1 | | |

*Clouding, less than 10% = excellent transparency
10% or more = inferior transparency

EXAMPLE 35

A woven fabric of 100% polyester spun was padded with the aqueous dispersion (X-1) and was squeezed at a squeezing degree of 70%, and thereafter, the resultant was dried at 120° C. for 5 minutes, soaped with a neutral detergent (0.2 g/liter) at 60° C. for 5 minutes, washed with water for 5 minutes, and dried with press. The thus treated woven fabric had properties as shown in Table 28.

EXAMPLE 36

The aqueous dispersion (X-1) (100 parts) and Sumitex M-3 (made by Sumitomo Chemical Co.) (4 parts) were mixed with agitation to give a treating agent.

In the same manner as described in Example 35 except that the treating agent as obtained above was used instead of the aqueous dispersion (X-1), a woven fabric was treated wherein the fabric was dried at 100° C. for 2 minutes and subjected to heat-treatment at 160° C. for 2 minutes. The properties of the fabric are also shown in Table 28.

REFERENCE EXAMPLE 37

Sumitex M-3 (100 parts), Sumitex AC-C (10 parts) and water (100 parts) were mixed with agitation to give a treating agent.

In the same manner as described in Example 35 except that the treating agent as obtained above was used instead of the aqueous dispersion (X-1), a woven fabric was treated. The properties of the fabric are also shown in Table 28.

TABLE 28

| Properties of the treated fabric | Example No. | | Reference Example No. |
|---|---|---|---|
| | 35 | 36 | 37 |
| Hardness* (mm) | 58 | 67 | 70 |
| Retention of hardness** after washing for 5 times (%) | 75 | 80 | 45 |

*It was measured by cantilever method.
**Degree of retention of hardness after 5 times repeat of washing with a neutral detergent (1 g/liter) at 40° C. for 10 minutes, washing with water for 10 minutes and drying with press in comparison with that before washing.
****

What is claimed is:

1. An aqueous dispersion of polyester resin which comprises
   (A) a crystalline polyester having a molecular weight of 2,500 to 30,000 and a melting point of 70° to 200° C. and, comprising polycarboxylic acid components consisting of 40 to 99.5% by mole of an aromatic dicarboxylic acid having no metal sulfonate group, 59.5 to 0% by mole of an aliphatic or alicyclic dicarboxylic acid having 4 to 36 carbon atoms and 0.5 to 10% by mole of an aromatic dicarboxylic acid having a metal sulfonate group, and polyol components consisting of 20 to 100% by mole of an aliphatic glycol having 2 to 8 carbon atoms and/or an alicyclic glycol having 6 to 12 carbon atoms and 80 to 0% by mole of bisphenol A ethylene oxide or propylene oxide adduct,
   (B) a non-crystalline polyester having a molecular weight of 2,500 to 30,000 and a softening point of 60° to 180° C. and comprising polycarboxylic acid components consisting of 40 to 99.5% by mole of an aromatic dicarboxylic acid having no metal sulfonate group, 59.5 to 0% by mole of an aliphatic or alicyclic dicarboxylic acid having 4 to 36 carbon atoms and 0.5 to 10% by mole of an aromatic dicarboxylic acid having a metal sulfonate group, and polyol components consisting of 20 to 100% by mole of an aliphatic glycol having 2 to 8 carbon atoms and/or an alicyclic glycol having 6 to 12 carbon atoms and 80 to 0% by mole of bisphenol A ethylene oxide or propylene oxide adduct,
   (C) a water-soluble organic compound having a boiling point of 60° to 200° C., and
   (D) water, said components (A), (B), (C), and (D) being incorporated in the following weight ratio:

$$A/B = 0 - 95/100 - 5 \tag{1}$$

$$A + B/C/D = 10 - 70/2 - 40/20 - 88 \tag{2}$$

$$0.02 \leq C/C + D \leq 0.66. \tag{3}$$

2. An aqueous dispersion according to claim 1, which comprises
   (B) a non-crystalline polyester having a molecular weight of 2,500 and 30,000 and a softening point of 60° to 180° C. and comprising polycarboxylic acid components consisting of 40 to 99.5% by mole of an aromatic dicarboxylic acid having no metal sulfonate group, 59.5 to 0% by mole of an aliphatic or alicyclic dicarboxylic acid having 4 to 36 carbon atoms and 0.3 to 10% by mole of an aromatic dicarboxylic acid having a metal sulfonate group, and polyol components consisting of 20 to 100% by mole of an aliphatic glycol having 2 to 8 carbon atoms and/or an alicyclic glycol having 6 to 12 carbon atoms and 80 to 0% by mole of bisphenol A ethylene oxide or propylene oxide adduct,
   (C) a water-soluble organic compound having a boiling point of 60° to 200° C., and
   (D) water, said components (B), (C) and (D) being incorporated in the following weight ratio:

$$B + C + D = 100 \tag{1}$$

$$B/C/D = 10 - 70/2 - 40/20 - 88 \tag{2}$$

$$0.02 \leq C/C + D \leq 0.66. \tag{3}$$

3. An aqueous dispersion according to claim 1, wherein the crystalline polyester comprises 50 to 99.5% by mole of an aromatic polycarboxylic acid selected from the group consisting of terephthalic acid and isophthalic acid as the polycarboxylic acid component and 85 to 100% by mole of a polyol selected from the group consisting of ethylene glycol and butanediol as the polyol component.

4. An aqueous dispersion according to claim 1 or 2, wherein the non-crystalline polyester comprises 10 to 80% by mole of terephthalic acid as the polycarboxylic acid component and 20 to 80% by mole of a polyol selected from the group consisting of ethylene glycol and butanediol as the polyol component.

5. An aqueous dispersion according to claim 1 or 2, wherein the polyester (B) is copolymerized with a tri- or more polycarboxylic acid selected from trimellitic acid and pyromellitic acid in an amount of 0.01 to 10% by mole based on the total polycarboxylic acid components.

6. An aqueous dispersion according to claim 1 or 2, wherein the polyester (B) is copolymerized with a tri- or more polyvalent polyol selected from trimethylolpropane, trimethylolethane, glycerine and pentaerythritol in an amount of 0.01 to 10% by mole based on the total polyol components.

7. An aqueous dispersion according to claim 1 or 2, wherein the polyester (B) is copolymerized with a polyalkylene glycol having a molecular weight of 106 to 10,000 in an amount of 0.01 to 5% by weight based on the total weight of the polyol components.

8. An aqueous dispersion according to claim 1 or 2, wherein the glycol component of the non-crystalline polyester is a combination of ethylene glycol and neopentyl glycol in a molar ratio of 70:30 to 30:70.

9. An aqueous dispersion according to claim 1, which is additionally incorporated with at least one compound selected from the group consisting of an amino resin, an epoxy resin and an isocyanate compound.

10. An aqueous dispersion according to claim 1, wherein the water-soluble organic compound is a member selected from the group consisting of an ethylene glycol monoalkyl ether and a monoalcohol having a boiling point of 100° C. or higher.

* * * * *